(12) United States Patent
Uppal (10) Patent No.: US 11,003,937 B2
(45) Date of Patent: May 11, 2021

(54) SYSTEM FOR EXTRACTING TEXT FROM IMAGES

(71) Applicant: Infrrd Inc, San Jose, CA (US)

(72) Inventor: Akshay Uppal, Bangalore (IN)

(73) Assignee: Infrrd Inc, San Jose, CA (US)

( * ) Notice: Subject to any disclaimer, the term of this patent is extended or adjusted under 35 U.S.C. 154(b) by 64 days.

(21) Appl. No.: 16/452,537

(22) Filed: Jun. 26, 2019

(65) Prior Publication Data

US 2020/0026944 A1 Jan. 23, 2020

(51) Int. Cl.
*G06K 9/20* (2006.01)
*G06N 3/04* (2006.01)

(52) U.S. Cl.
CPC ........ *G06K 9/2054* (2013.01); *G06N 3/0472* (2013.01); *G06K 2209/01* (2013.01)

(58) Field of Classification Search
CPC .. G06K 9/3208; G06K 9/2054; G06K 9/6274; G06K 9/344; G06K 2209/25; G06K 2209/01; G06N 3/084; G06N 3/0472; G06N 3/0454
See application file for complete search history.

(56) References Cited

U.S. PATENT DOCUMENTS

| | | | | |
|---|---|---|---|---|
| 5,912,986 A | * | 6/1999 | Shustorovich | G06K 9/32 382/156 |
| 8,175,388 B1 | * | 5/2012 | Fisher | G06K 9/3208 382/181 |
| 10,372,821 B2 | * | 8/2019 | Chang | G06F 40/151 |
| 10,423,827 B1 | * | 9/2019 | Wu | G06K 9/00463 |
| 2010/0316295 A1 | * | 12/2010 | Morimoto | G06K 9/3208 382/182 |
| 2011/0211759 A1 | * | 9/2011 | Park | G06K 9/48 382/182 |
| 2013/0343652 A1 | * | 12/2013 | Goto | G06K 9/00442 382/182 |
| 2017/0161580 A1 | * | 6/2017 | Chulinin | G06K 9/00463 |
| 2017/0364770 A1 | * | 12/2017 | Zagaynov | G06K 9/6212 |
| 2018/0158188 A1 | * | 6/2018 | Chu | G06T 7/11 |
| 2018/0315188 A1 | * | 11/2018 | Tegzes | G06T 7/11 |
| 2018/0322357 A1 | * | 11/2018 | Chen | G06T 7/73 |
| 2019/0026607 A1 | * | 1/2019 | Mao | G06K 9/6257 |
| 2019/0354818 A1 | * | 11/2019 | Reisswig | G06K 9/00456 |
| 2020/0311409 A1 | * | 10/2020 | Luo | G06N 3/04 |

FOREIGN PATENT DOCUMENTS

CN 108921163 A * 11/2018

* cited by examiner

*Primary Examiner* — Brenda C Bernardi (57) ABSTRACT

A system for extracting text from images comprises a processor configured to receive a digital copy of an image and identify a portion of the image, wherein the portion comprises text to be extracted. The processor further determines orientation of the portion of the image, and extracts text from the portion of the image considering the orientation of the portion of the image.

9 Claims, 12 Drawing Sheets

SYSTEM FOR EXTRACTING TEXT FROM IMAGES

BACKGROUND

Unless otherwise indicated herein, the materials described in this section are not prior art to the claims in this application and are not admitted to being prior art by inclusion in this section.

Field of the Invention

The subject matter in general relates to system for data extraction. More particularly, but not exclusively, the subject matter relates to extracting text from images.

Discussion of the Related Art

Computerized document processing includes scanning of logos, stamps or documents and the conversion of an actual image of the logos, stamps or documents into an electronic image of the logos, stamps or documents. The electronic image of the document may comprise text, wherein the text may be of varying sizes, orientations, font and so on. The text may be extracted from the images for obtaining data or information, which may be of interest. The data may include date, address and so on. The text may be extracted from the image of the document by optical character recognition (OCR) techniques.

In certain cases, the images of the scanned documents may not be of a fixed orientation with respect to a reference axis. That is to say, each of the image to be processed may be oriented differently. In such cases, the OCR techniques may fail, as the OCR techniques may not be able to process the random orientation of the images. In such scenarios, re-orientation may have to done manually. Manual re-orientation of the text or images may be time consuming when the data to be processed is significantly large.

Additionally, the OCR techniques may fail to produce an accurate result when the text to be extracted from the image may not be oriented horizontally. That is to say, the different characters and text in logos, stamps or scanned documents may possess different orientation with respect to a reference axis.

Further, most of the current OCR techniques aim to extract text from images with a simple background. When the relevant text to be extracted is occluded by a complex background (text or image background), the OCR techniques may not be able to completely isolate the complex background from the relevant data. As an example, the OCR techniques may produce accurate results when the background of the relevant data is plane. But on the other hand, OCR techniques may fail to produce an optimum result, when the background text overlap the relevant text.

As an example, a page in a passport may include a stamp, placed by an immigration officer. The stamp may include a data, which may be the data or information that may be of interest. The stamp may be placed over other text that may be in the background. Furthermore, stamp as well as the text therein may be in an orientation different from that of the text in the background. Machine driven extraction of data of interest (e.g., date) in such a scenario poses a significant challenge.

In view of the foregoing discussions, there is a need for an improved technique for extracting data from composite images.

SUMMARY

In one aspect, a system is provided for extracting text from images. The system comprises a processor configured to receive a digital copy of an image and identify a portion of the image, wherein the portion comprises text to be extracted. The processor further determines orientation of the portion of the image, and extracts text from the portion of the image considering the orientation of the portion of the image.

In another aspect, a method is provided for extracting text from images. The method comprises receiving, by a computing infrastructure, a digital copy of an image and identifying a portion of the image, wherein the portion comprises text to be extracted. The method further comprises determining, by the computing infrastructure, orientation of the portion of the image, and extracting text from the portion of the image considering the orientation of the portion of the image.

BRIEF DESCRIPTION OF DRAWINGS

This disclosure is illustrated by way of example and not limitation in the accompanying figures. Elements illustrated in the figures are not necessarily drawn to scale, in which like references indicate similar elements and in which.

DETAILED DESCRIPTION OF THE INVENTION

The following detailed description includes references to the accompanying drawings, which form part of the detailed description. The drawings show illustrations in accordance with example embodiments. These example embodiments are described in enough detail to enable those skilled in the art to practice the present subject matter. However, it may be apparent to one with ordinary skill in the art that the present invention may be practised without these specific details. In other instances, well-known methods, procedures and components have not been described in detail so as not to unnecessarily obscure aspects of the embodiments. The embodiments can be combined, other embodiments can be utilized, or structural and logical changes can be made without departing from the scope of the invention. The following detailed description is, therefore, not to be taken in a limiting sense.

In this document, the terms "a" or "an" are used, as is common in patent documents, to include one or more than one. In this document, the term "or" is used to refer to a non-exclusive "or", such that "A or B" includes "A but not B", "B but not A", and "A and B", unless otherwise indicated.

It should be understood that the capabilities of the invention described in the present disclosure and elements shown in the figures may be implemented in various forms of hardware, firmware, software, recordable medium or combinations thereof.

Figure 1A:
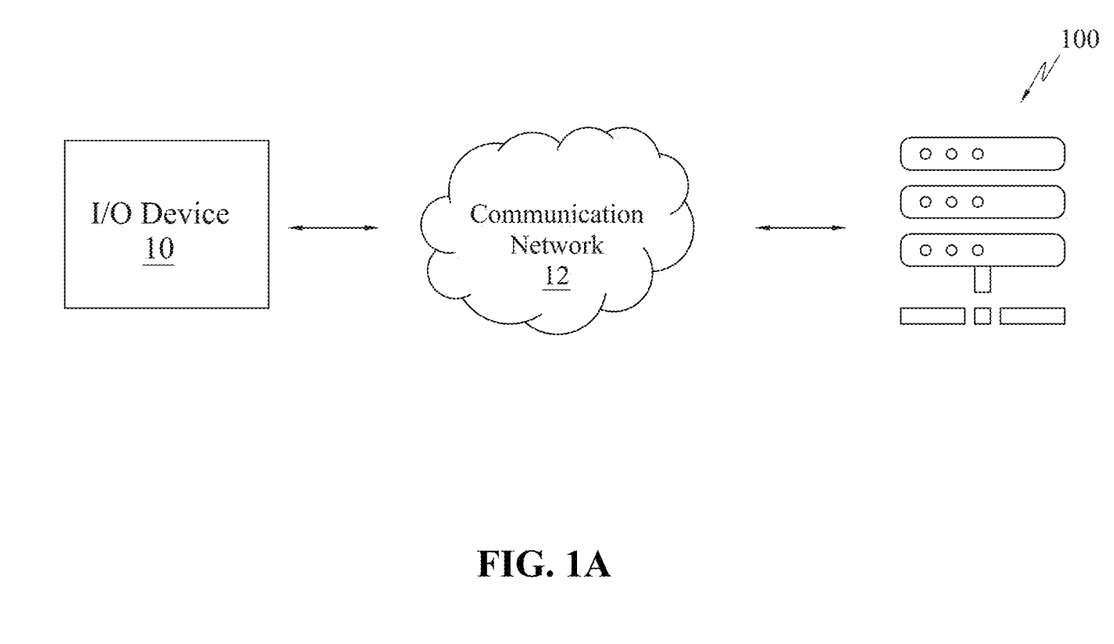
FIG. 1A illustrates a system 100 for extracting text from images, in accordance with an embodiment.

FIG. 1A illustrates a system 100 (e.g., computing infrastructure) for extracting data 204 from composite images 206 (refer FIG. 2A), in accordance with an embodiment. The system 100 may communicate with I/O device 10 via a communication network 12. Alternatively, the I/O device 10 may be part of the system 100. The system 100, which may be a server, may receive images from the I/O device 10 via the communication network 12.

Figure 1B:
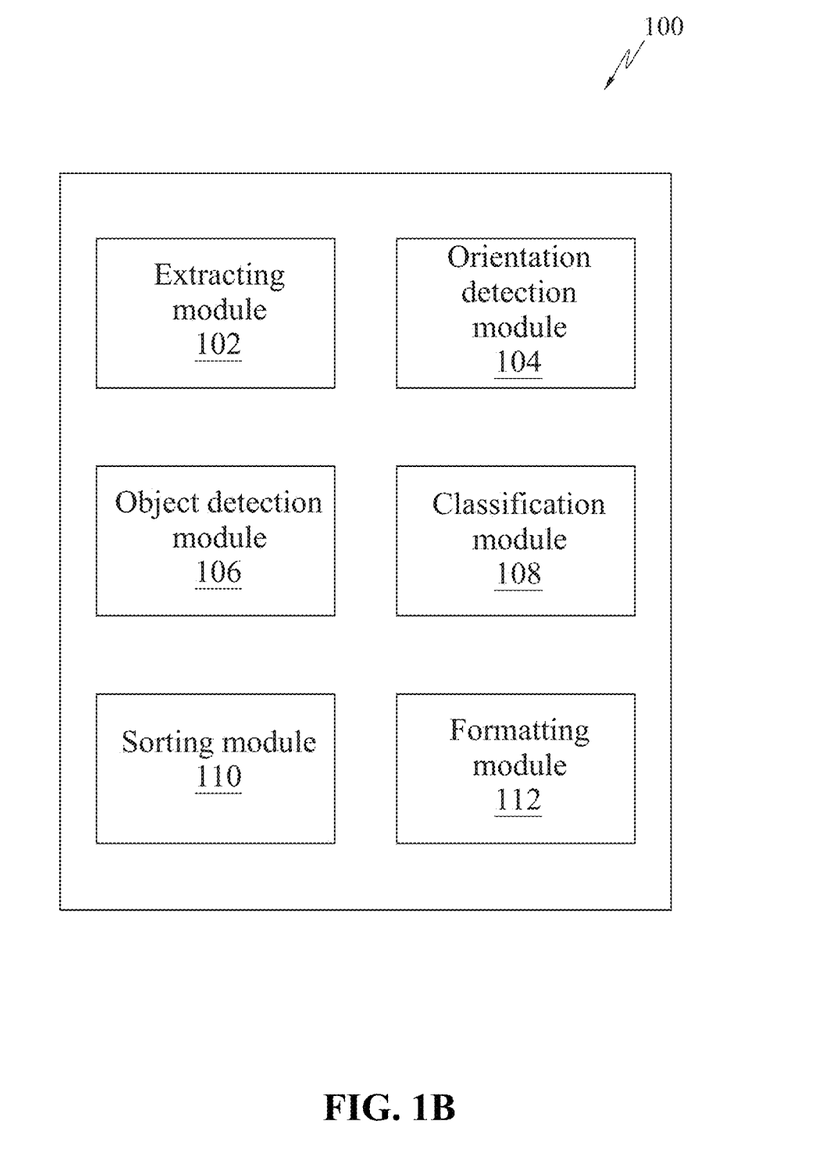
FIG. 1B illustrates various modules of the system 100 for extracting text from the images, in accordance with an embodiment.
Figure 2A:
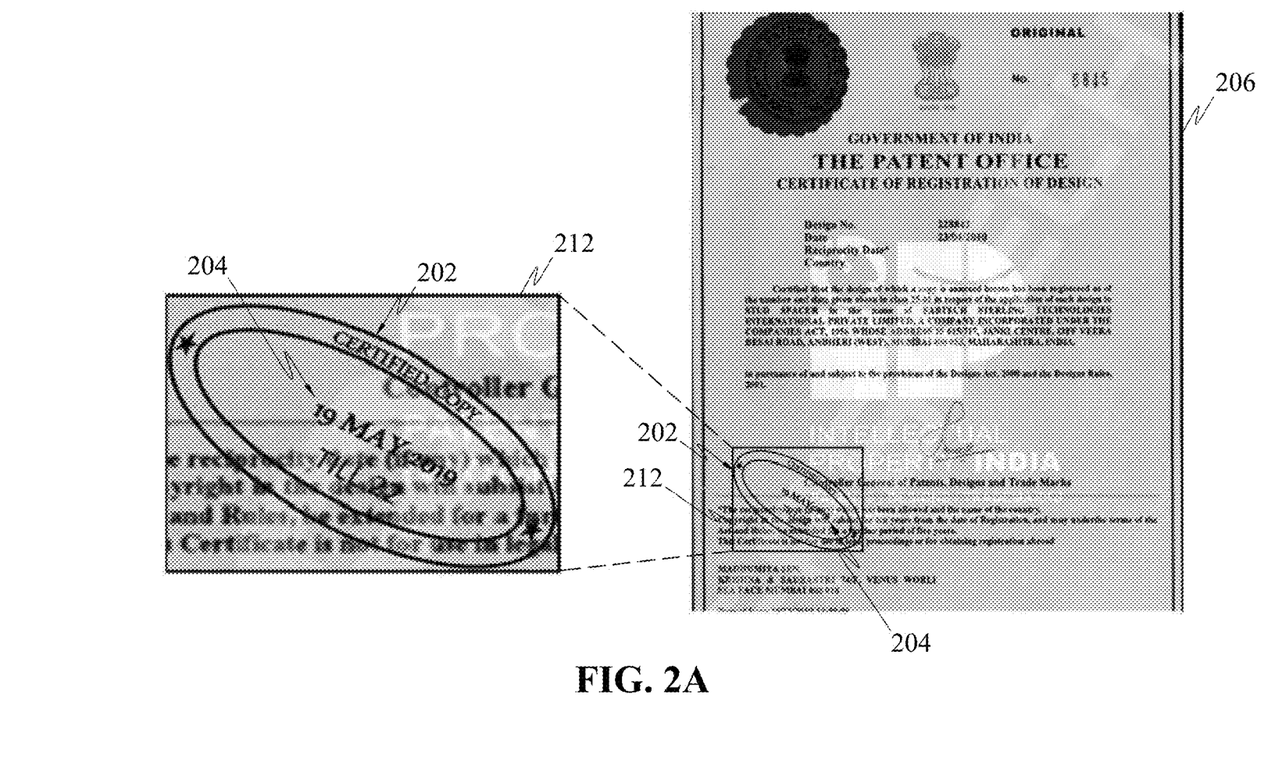
FIG. 2A illustrates relevant portion 202 within a relevant section 212 of an image 206, in accordance with an embodiment.

Referring to the figures, and more particularly to FIG. 1B and FIG. 2A, the system 100 for extracting relevant text 204 (data) from the image 206 is provided, in accordance with an embodiment. The image 206 may comprise a relevant section 212, wherein the relevant section 212 may include a relevant portion 202 (second image). As an example, the image 206 may be a page from a passport and the relevant portion 202 may be a stamp placed within the image 206, wherein the relevant section 212 may bind the stamp 202. The system 100 may be trained for identifying and processing the relevant portion 202 of the image 206. The relevant portion 202 of the image 206 may correspond to stamps, logos and so on. That is to say, the system 100 may be trained to identify stamps, logos and so on, from the images 206 and then process the extracted stamps, logos and so on, to extract a relevant text 204 present within the stamps, logos and so on.

In an embodiment, referring to FIG. 1B, for extracting text 204 from the image 206, the system 100 may comprise an extracting module 102, an orientation detection module 104, an object detection module 106, a classification module 108, a sorting module 110 and a formatting module 112. The instructions of each of these modules may be executed by one or more processors 902 (refer FIG. 9). The instructions may be stored in the memory unit 904 (refer FIG. 9).

Figure 3:
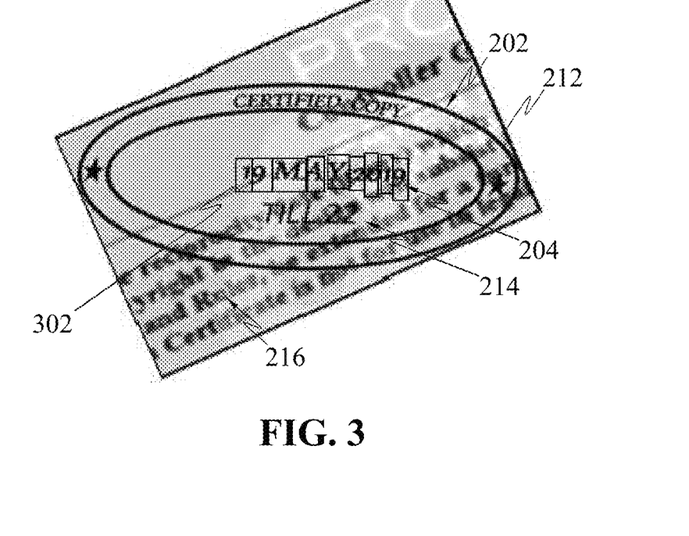
FIG. 3 illustrates character bounding boxes 302, in accordance with an embodiment.

In an embodiment, referring to FIG. 2A and FIG. 3, the text 204 may be extracted from images 206, wherein the image 206 may be a composite image. That is to say, the text 204 within the relevant portion 202 of the image 206 may be occluded by background text 216 ('irrelevant characters 216'). Further, the relevant portion 202 of the image 206 may not be horizontally oriented with respect to a reference. As an example, the stamp 202 of the image 206 may be oriented differently with respect to the reference. Further, the date 204 marked on the stamp 202 may be occluded by the background text 216.

In an embodiment, referring to FIG. 2A, the extracting module 102 may be configured to identify and extract the relevant section 212 of the image 206. The relevant section 212 may include the relevant portion 202 (e.g. stamp, logo or the like), and the image 206 may correspond to passport, letters or the like. In this example, the relevant portion 202 corresponds to a stamp 202. The extracting module 102 may comprise a first custom deep neural network, wherein the first custom deep neural network may be trained to identify (detect) the relevant portion 202 of the image 206. The extracting module 102 may further comprise a cropping module. The cropping module may be configured to extract the relevant section 212 comprising the relevant portion 202 within the image 206. As an example, the extracting module 102 may first identify the stamp 202 within the image 206, using the first custom deep neural network and then, may crop out the relevant section 212 that binds the stamp 202 from the image 206 using the cropping module.

Figure 2B:
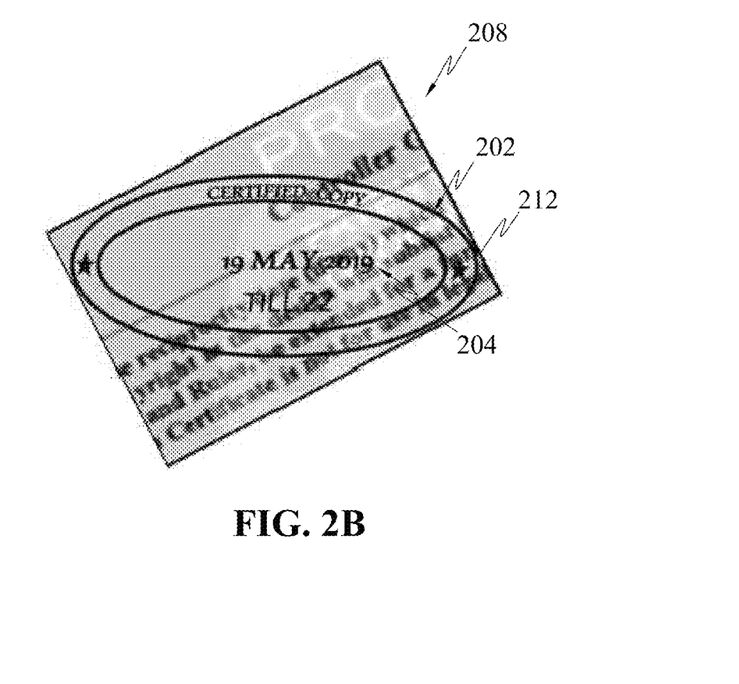
FIG. 2B illustrates a correct orientation of the relevant portion 202, in accordance with an embodiment.

In an embodiment, referring to FIG. 2A, the orientation detection module 104 may determine the orientation of the relevant portion 202. The orientation may be determined with respect to reference. The reference may be within the relevant portion 202. In certain scenarios, the relevant portion 202 of image 206 may not be horizontally oriented with respect to the reference, wherein the reference may be a text 204 within the relevant portion 202. As an example, the stamp 202 may be oriented at 315° (anticlockwise) or 45° (clockwise). In other words, the text 204 (reference) may be oriented at 45° as compared to the image 206. The orientation detection module 104 may be configured to comprise a second custom deep neural network to determine the orientation of the relevant portion 202 within the relevant section 212. The second custom deep neural network may classify orientation of the relevant portion 202 into a group. There may be 360 groups as an example, wherein each of the groups may correspond to each degree of angle. As an example, the first group may correspond to 0°, the second group may correspond to 1°, the last group may correspond to 359° and so on. The orientation detection module 104 may further comprise a rotation correction module for correcting the orientation (reorientation) of the relevant portion 202, with respect to the reference. As an example, referring to FIG. 2B, the stamp 202 may be reoriented by an angle of 45° anticlockwise to correct the orientation of the stamp 202.

In an embodiment, referring to FIG. 3, the object detection module 106 may be configured to identify characters within the relevant text 204. The characters may be digits, alphabets and so on. The relevant portion 202 may comprise of characters in which, some characters may be relevant (within the relevant text 204) and some may be irrelevant characters 214, 216. The object detection module 106 may comprise a third custom deep neural network for detecting the characters within the relevant text 204. The third custom deep neural network may be trained to identify and bind each character of the relevant text 204 by different boxes 302

("character bounding boxes 302"). The output of the third custom deep neural network may be coordinates of each character bounding box 302. The object detection module 106 may further comprise the cropping module for cropping the character bounding boxes 302. That is to say, each of the characters of the relevant text 204 may be cropped out of the image 206. As an example, the characters '1', '9', 'M', 'A', 'Y', '2', '0', '1' and '9', may be cropped out from the text 204. The object detection module 106 may not extract the characters in the same sequence as present in the relevant text 204. As an example, output of the object detection module 106 may be in an order: 'M', 'Y', '1', 'A', '9', '9', '1', '2' and '0'. The object detection module 106 may be configured to detect and crop out the relevant characters within the relevant text 204. The irrelevant characters 214, 216 within the relevant portion 202 may not be extracted by the object detection module 106. In an embodiment, the irrelevant characters 214 may be oriented in the same direction as that of the relevant characters within the text 204. In an embodiment, the irrelevant characters 216 may be oriented in one or more directions that are different compared to the direction of the relevant characters within the text 204.

In an embodiment, the classification module 108 may be configured to classify each of the characters into a character group. There may be 36 groups, as an example, wherein each of the group may correspond to each alphabet 'A' to 'Z' or digit '0' to '9'. As an example, the first character group may correspond to alphabet 'A', the second character group may correspond to 'B', the last group may correspond to '9' and so on. The classification module 108 may comprise a fourth custom deep neural network for classifying the characters of the relevant text 204. The fourth custom deep neural network may be classification deep neural network. The classification module 108 may be trained for classifying each of the character into the character group. In an embodiment, the classification module 108 may not provide the output in the same sequence as present in the relevant text 204. As an example, output of the classification module 108 may be in an order: 'M', 'Y', '1', 'A', '9', '9', '1', '2' and '0'.

In an embodiment, the sorting module 110 may be configured to sort the characters of the relevant text 204. The characters may be sorted using the coordinates of the bounding boxes 302 to obtain the same sequence as present in the text 204.

In an embodiment, the formatting module 112 may rearrange the characters in a pre-set format. As an example, the pre-set format may be YYYY-MM-DD, wherein 'YYYY' represents the year, 'MM' represents the month and 'DD' represents the date.

Having discussed about the various modules involved in extracting text 204 from images 206, training of the different neural networks (first custom deep neural network, second custom deep neural network, third custom deep neural network and fourth custom deep neural network) of the system 100 is discussed hereunder.

Figure 4A:
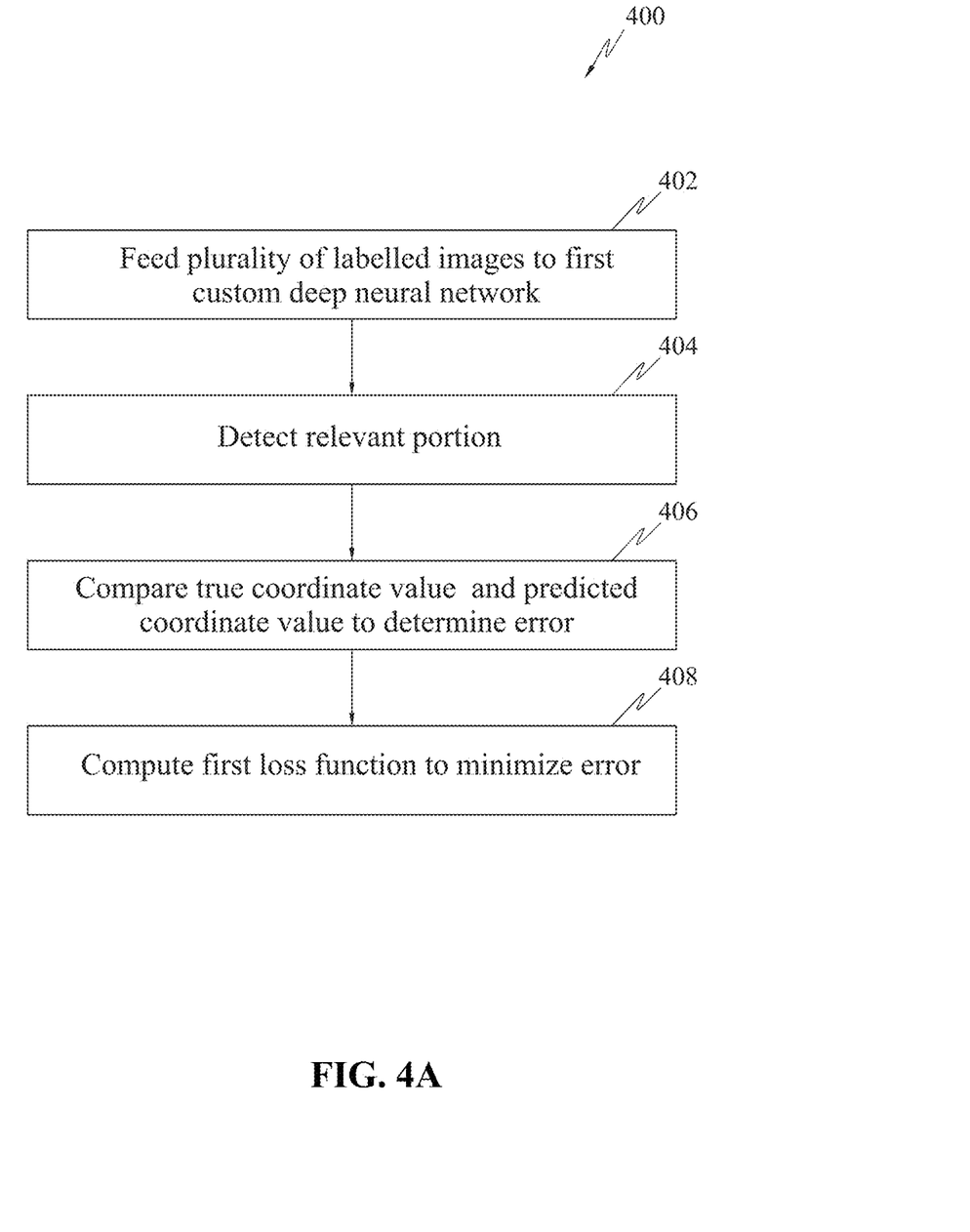
FIG. 4A is a flowchart 400 illustrating the steps involved in training of a first custom deep neural network, in accordance with an embodiment.

FIG. 4A is a flowchart 400 illustrating the training of the first custom deep neural network. The first custom deep neural network may be trained for identifying the relevant portion 202 within the image 206. As an example, the first custom deep neural network may be trained to identify the stamp 202 within the image 206 (refer FIG. 2A).

Figure 4B:
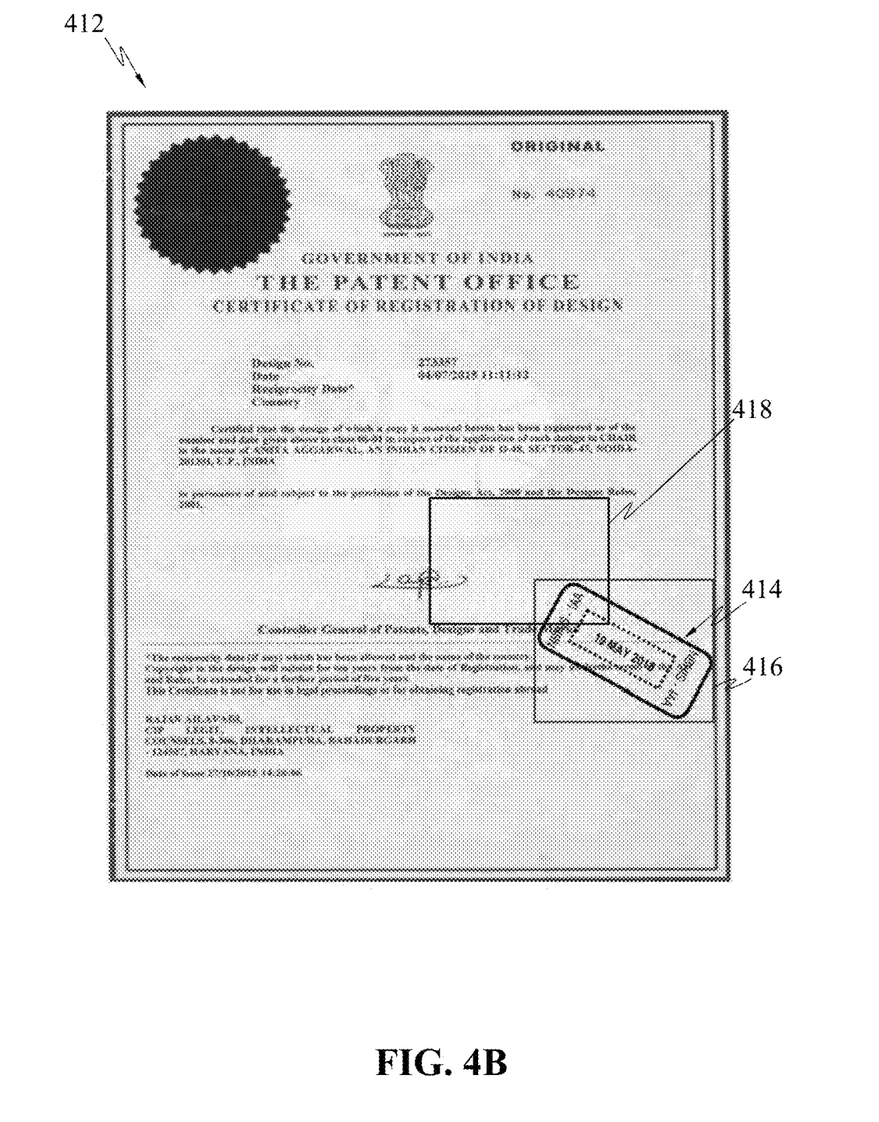
FIG. 4B illustrates a labelled training image 412 for training of the first custom deep neural network for identifying the relevant portion 202 within the image 412, in accordance with an embodiment.

In an embodiment, at step 402, referring to FIG. 4B as well, the first custom deep neural network may receive plurality of labelled training images 412. The plurality of labelled training images 412 may correspond to images of various documents comprising sample stamps 414 ("relevant sample portion 414"). The sample stamps 414 may be from various countries and of various orientations, fonts, formats, colours and so on. Coordinates of the sample stamp 414 within the training image 412 may be determined manually and may be saved. The coordinates box/area 416 ('bounding box 416') binding the sample stamps 414 may be saved, may correspond to a "true" coordinate value. That is to say, the first custom deep neural network may receive plurality of training images 412, wherein each of the training images 412 may be labelled with the coordinates of areas binding the sample stamps 414.

In an embodiment, at step 404, the first custom deep neural network may identify an area defined by the co-ordinates of box 418 (predicted coordinate value) as the area within which the relevant portion is present. However, the relevant sample portion 414 is within the co-ordinates defined by the bounding boxes 416 (true coordinate value). As explained earlier, each training image may be associated with its respective true coordinate values.

In an embodiment, at step 406, the first custom deep neural network may compare the true coordinate value and the predicted coordinate value to determine the occurrence of an error, if any. The error may be the difference between the true coordinate value and the predicted coordinate value. As is the case in the example of FIG. 4B, the first custom deep neural network may identify a different portion box 418 as comprising the relevant sample portion. In such scenarios, the predicted coordinate value may be different from the true coordinate value.

In an embodiment, at step 408, a loss is calculated using a first loss function that may be backpropagated through the first custom deep neural network to optimize parameters, wherein the parameters may be updated as guided by optimization techniques. Such errors will be minimized as the neural network gets trained.

In an embodiment, the trained first custom deep neural network may be present in the extracting module 102 of the system 100.

Having discussed about the training of the first custom deep neural network, training of the second custom deep neural network for determining the orientation of the relevant portion 202 is discussed hereunder.

Figure 5:
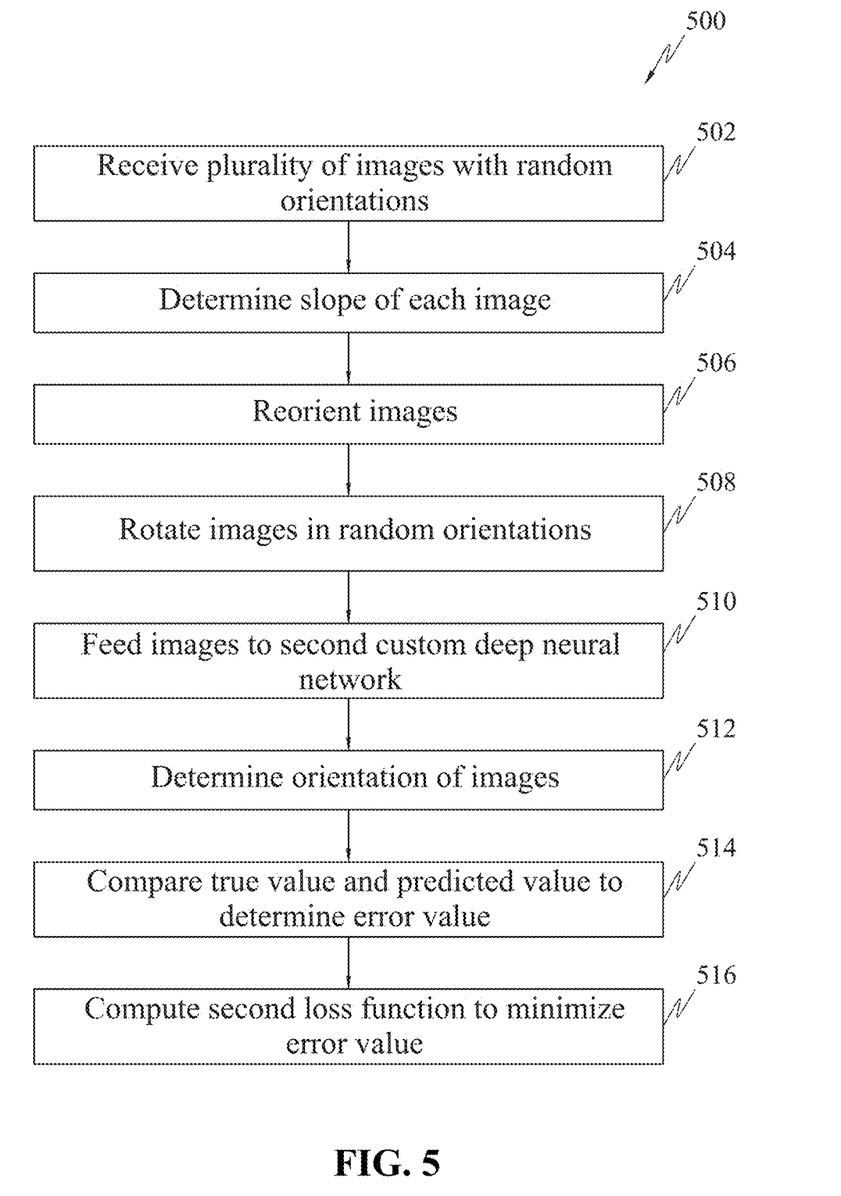
FIG. 5 is a flowchart 500 illustrating the steps involved in training of a second custom deep neural network for determining the orientation of the relevant portion 202 within the image 206, in accordance with an embodiment.

FIG. 5 is a flowchart 500 illustrating the training of the second custom deep neural network. The second custom deep neural network may be trained for determining the orientation of the relevant portion 202 within the relevant section 212.

In an embodiment, at step 502, a plurality of images with random orientations with respect to the reference may be obtained from different sources. The plurality of images may form a training dataset, wherein the plurality of images may correspond to stamps, logos and the like.

In an embodiment, at step 504, a slope of each image, with respect to the reference, may be determined. The slope may correspond to the orientation of the image. The slope may be determined manually, using conventional methods.

In an embodiment, at step 506, the images may be reoriented horizontally with respect to the reference. That is to say, each image (wherever required) of the dataset may be reoriented such that the slope of each of reoriented image may be 0° (refer FIG. 3).

In an embodiment, at step 508, each of the horizontally reoriented images may be sampled to generate multiple images (e.g., orientation training images) with random orientations. That is to say, each of the horizontally oriented image may be rotated by different angles and the new sample images generated from the horizontal image may be saved.

The rotation may be carried out by a software module, executed by a processor. Consequently, the dataset may comprise of a greater number of images compared to original number of images. As an example, the original training dataset may comprise of 20,000 images of random orientations. For training the second custom deep neural network, greater number of images may be required than the original 20,000 images (dataset). Therefore, to generate greater number of images the randomly oriented images may be reoriented horizontally and each image may be sampled to generate more images with various orientations. Consequently, the dataset may now comprise of more number of images than the original 20,000 images. The orientation of each of the sample images may be saved and may correspond to a true value.

In an embodiment, at step 510, the labelled images may be fed to the second custom deep neural network, wherein the label corresponds to the orientation of the image. The second custom deep neural network may be a deep rotation custom neural network.

In an embodiment, at step 512, the second custom deep neural network may predict the orientation of the images. The orientation of the images, predicated by the second custom deep neural network, may correspond to a predicted value. The predicted value of orientation of the images may not be the same as the true value. As an example, the image may have been oriented to 45° (true value) whereas the orientation predicted by the second custom deep neural network may be 43° (predicted value). That is to say, the predicted value (43°) is different from the true value (45°).

In an embodiment, at step 514, a difference between the true value and the predicted value may be determined by the processor. The difference between the true value and the predicted value may correspond to an error value. As an example, the difference between the true value (45°) and the predicted value (43°) may be 2°.

In an embodiment, at step 516, a second loss function may be determined by the processor to minimize the error value to obtain the correct orientation value. The second loss function may backpropagate the error value to hidden layers of the second custom deep neural network to minimize the error value.

In an embodiment, the trained second custom deep neural network may be present in the orientation detection module 104 of the system 100 for real-time orientation detection.

Having discussed the training of the second custom deep neural network for orientation detection, training of the third custom deep neural network is discussed hereunder.

Figure 6:
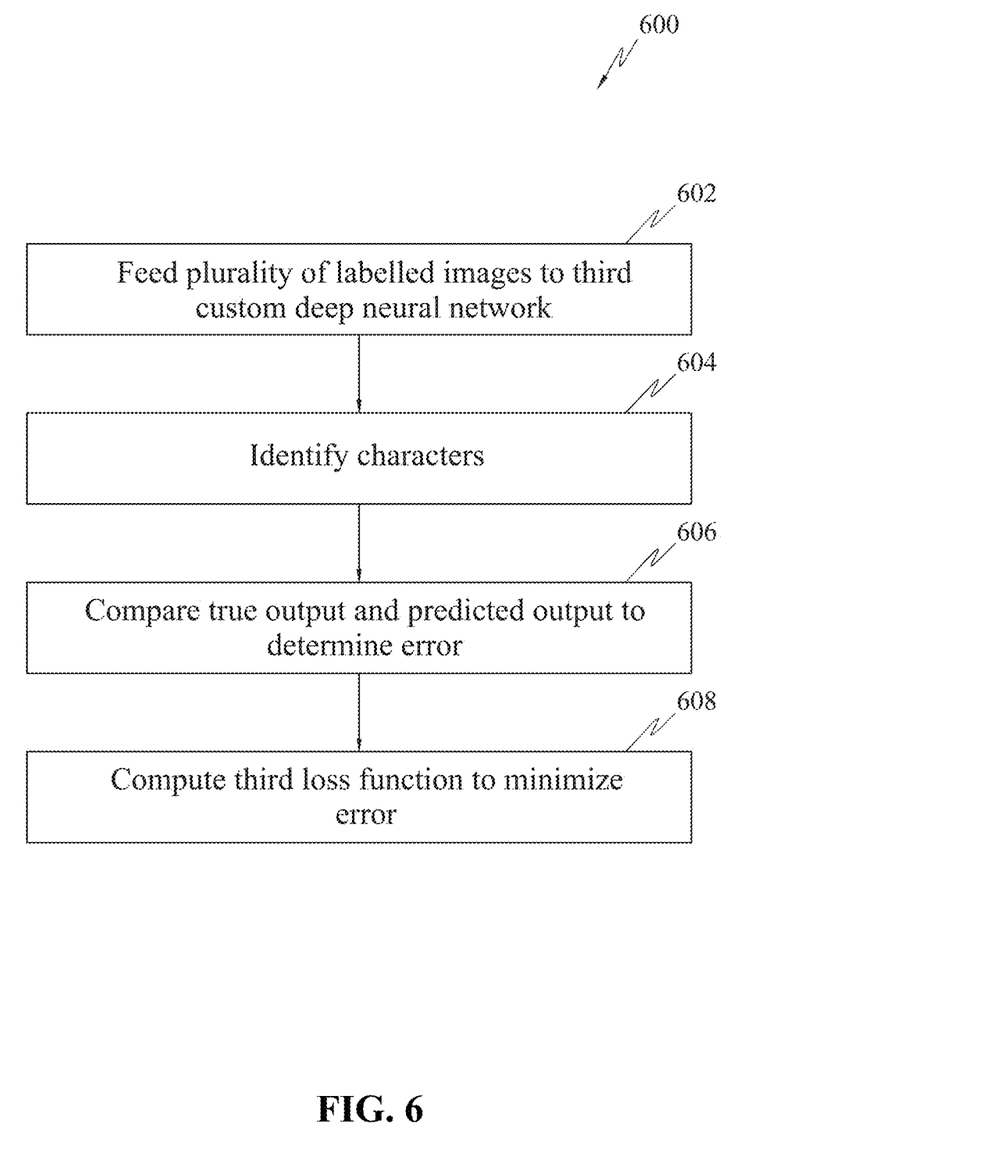
FIG. 6 is a flowchart 600 illustrating the steps involved in training of a third custom deep neural network for detecting characters within the text 204, in accordance with an embodiment.

FIG. 6 is a flowchart 600 illustrating the training of the third custom deep neural network. The third custom deep neural network may be trained for detecting the characters within the relevant text 204 of the image 206 (refer FIG. 2A). As an example, the third custom deep neural network may be trained to detect the characters within the date 204 marked within the stamp 202.

In an embodiment, at step 602, the third custom deep neural network may receive plurality of labelled training images. The plurality of images may comprise dates in various formats. The various formats may be numeric format, wherein month, date of the month and year may be represented as numerals, or alphanumeric format, wherein date of the month and year may be represented as numerals and month may be represented by letters. As an example, the format of the date may be 03/05/2019 (numeric format) or 03 MAY 2019 (alphanumeric format). Coordinates of each character within the date may be determined manually and may be saved. That is to say, the third custom deep neural network may receive plurality of training images, wherein the training images may be labelled with the coordinates of the characters within the date. The coordinates of the characters may correspond to a true output.

In an embodiment, at step 604, the third custom deep neural network may identify the characters and may bind each of the character within the date using character bounding boxes. The coordinates of the character bounding boxes may correspond to a predicted output.

In an embodiment, at step 606, the third custom deep neural network may compare the predicted output and the true output to determine the occurrence of an error.

In an embodiment, at step 608, the error is calculated using a third loss function that may be backpropagated to the hidden layers of the third custom deep neural network to minimize the error. In this way, the third custom deep neural network may be trained to identify and bound the characters within the date, with occurrence of minimum error. The steps 604-608 may be executed by a processor.

In an embodiment, the trained third custom deep neural network may be present in the object detection module 106 of the system 100 for real-time processing.

Having discussed about the training of the third custom deep neural network, training of the fourth custom deep neural network for classifying the characters of the relevant text 204 is discussed hereunder.

Figure 7:
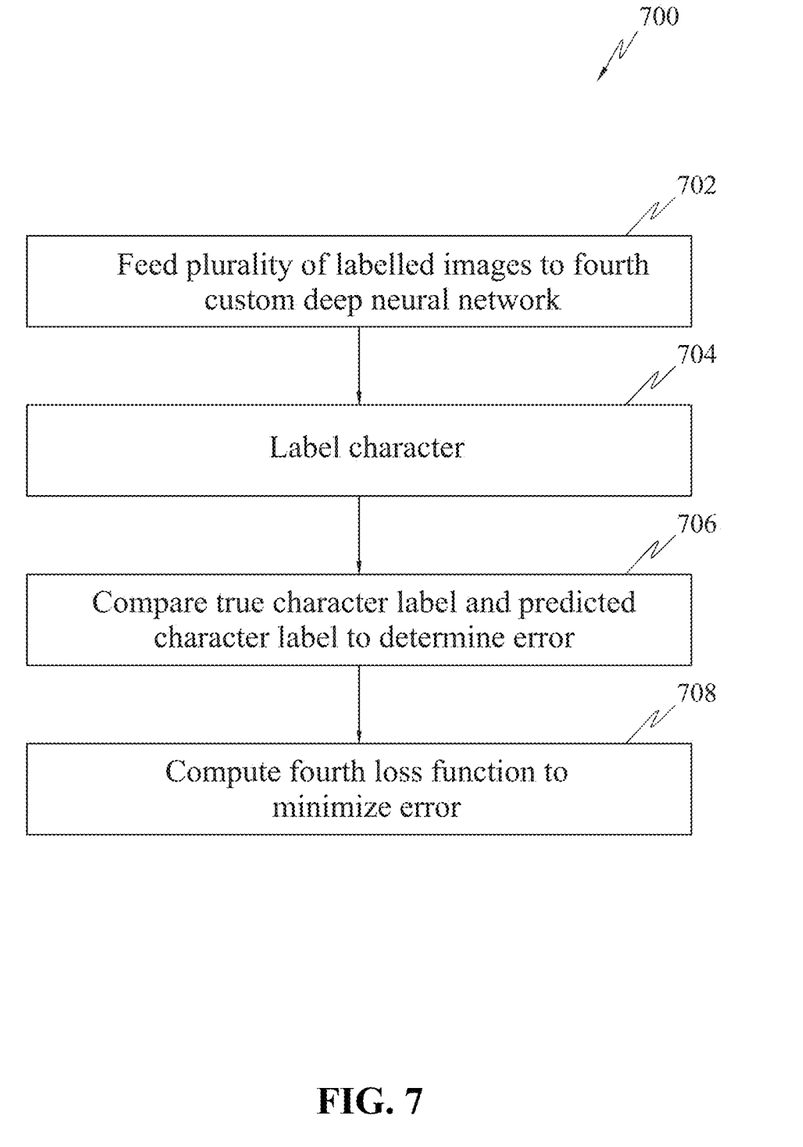
FIG. 7 is a flowchart 700 illustrating the training of a fourth custom deep neural network for classifying the characters within the text 204, in accordance with an embodiment.

FIG. 7 is a flowchart 700 illustrating the training of the fourth custom deep neural network for classifying the characters within the text 204. As an example, the fourth custom deep neural network may be trained to classify the digits and alphabets within the date 204 marked on the stamps 202 into the character group.

In an embodiment, at step 702, the fourth custom deep neural network may receive plurality of labelled images. The images may correspond to images of characters and the label may correspond to the corresponding character group. The characters may be alphabets ('A' to 'Z') or digits ('0' to '9'). As an example, the image fed to the fourth custom deep neural network may be image of the character 'A' labelled as the corresponding character group 'A'. The label may correspond to a true character label.

In an embodiment, at step 704, the fourth custom deep neural network may classify the character into one of the character group. The output of the fourth custom deep neural network may be a probability value of the character being classified into the corresponding character group. The probability value may correspond to a predicted character label. In certain scenarios, the true character label may not be the same as the predicted character label. As an example, the image fed to the fourth custom deep neural network may be labelled as 'A' (true character label) but the fourth custom deep neural network may generate the label 'A' with only 98% probability value (predicted character label). That is to say, the probability value of the image to be classified as 'A' is 98%, whereas the probability value should have been 100%.

In an embodiment, at step 706, the fourth custom deep neural network may compare the true character label and the predicted character label to determine an error. As an example, in the above mentioned example, the error may be 0.2.

In an embodiment, at step 708, a fourth loss function may calculate the error and may be backpropagated to hidden layers of the fourth custom deep neural network to optimize the output for classifying the image into the correct character group with minimum error. The steps 704-708 may be executed by a processor.

In an embodiment, the trained fourth custom deep neural network may be present in the classification module 108 of the system 100 for real-time character classification.

Having discussed about the training of the various neural networks, implementation of the system 100 is discussed hereunder.

Figure 8A:
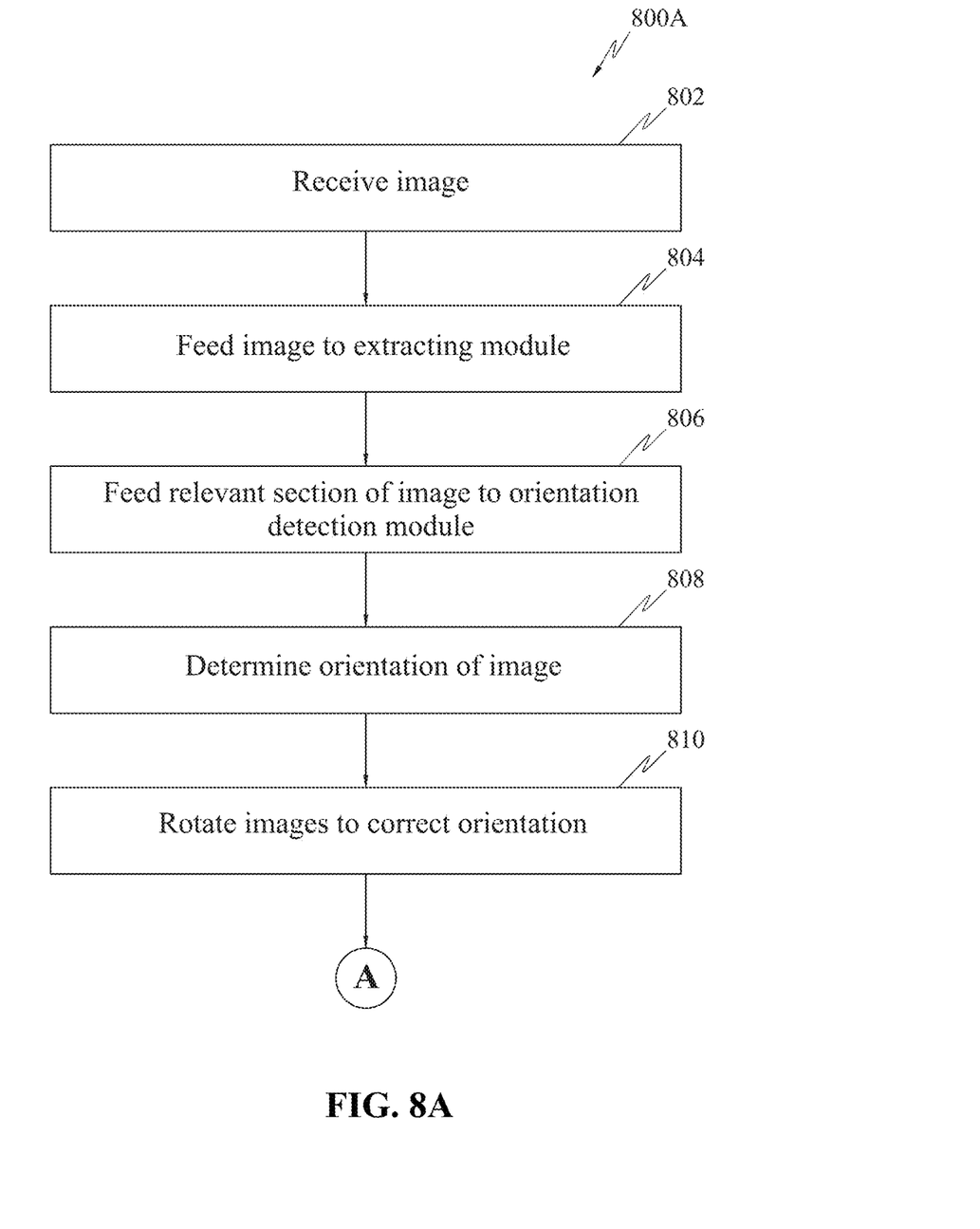
FIG. 8A is a flowchart 800A, illustrating the steps involved in the determination of the orientation of the relevant portion 202 in real-time, in accordance with an embodiment.

FIG. 8A is a flowchart 800A illustrating the steps, executed by the system 100, involved in the determination of the orientation of the relevant portion 202 of the image 206 in real-time.

In an embodiment, at step 802, referring to FIG. 2A, the image 206 from which the text 204 may be extracted, may be received. The image 206 may correspond to a scanned copy of documents such as passport, legal documents and so on. The image 206 may comprise of the relevant portion 202 and the relevant text 204. As an example, the relevant portion 202 may be the stamp and the relevant text 204 may be the date marked within the stamp.

In an embodiment, at step 804, the image 206 may be fed to the extracting module 102. The extracting module 102 may be configured to comprise the trained first custom deep neural network and the cropping module. Referring to FIG. 2A, the trained first custom deep neural network may identify the relevant portion 202 within the image 206 and may bind the relevant portion by the bounding box ('relevant section 212'). Then, the cropping module may crop out the bounding box 212 comprising the stamp 202. The output of the extracting module 102 may be the bounding box 212 comprising the stamp 202.

In an embodiment, at step 806, the relevant section 212 comprising the stamp 202 may be fed to the orientation detection module 104. The orientation detection module 104 may be configured to comprise the trained second custom deep neural network and the rotation correction module.

In an embodiment, at step 806, the trained second custom deep neural network may determine the orientation of the relevant portion 202 ('stamp 202') of the relevant section 212 with respect to the reference. The second custom deep neural network may further classify the orientation of the stamp 202 into one of the group, wherein each group corresponds to each degree of rotation. As an example, referring to FIG. 2A, the second custom deep neural network may classify the orientation of the stamp 202 to the group 45°.

In an embodiment, at step 806, the orientation of the stamp 202 may be corrected using the rotation correction module. As an example, referring to FIG. 2B, the relevant section 212 comprising the stamp 202 may be reoriented by an angle of 45° anticlockwise to correct the orientation of the stamp 202.

In an embodiment, the reoriented image may be fed to a conventional OCR (Optical Character Recognition) device to extract the relevant text 204 by conventional methods.

In another embodiment, referring to FIG. 8B, deep learning methods may be used to extract the characters within the text 204 which is described in detail below.

Figure 8B:
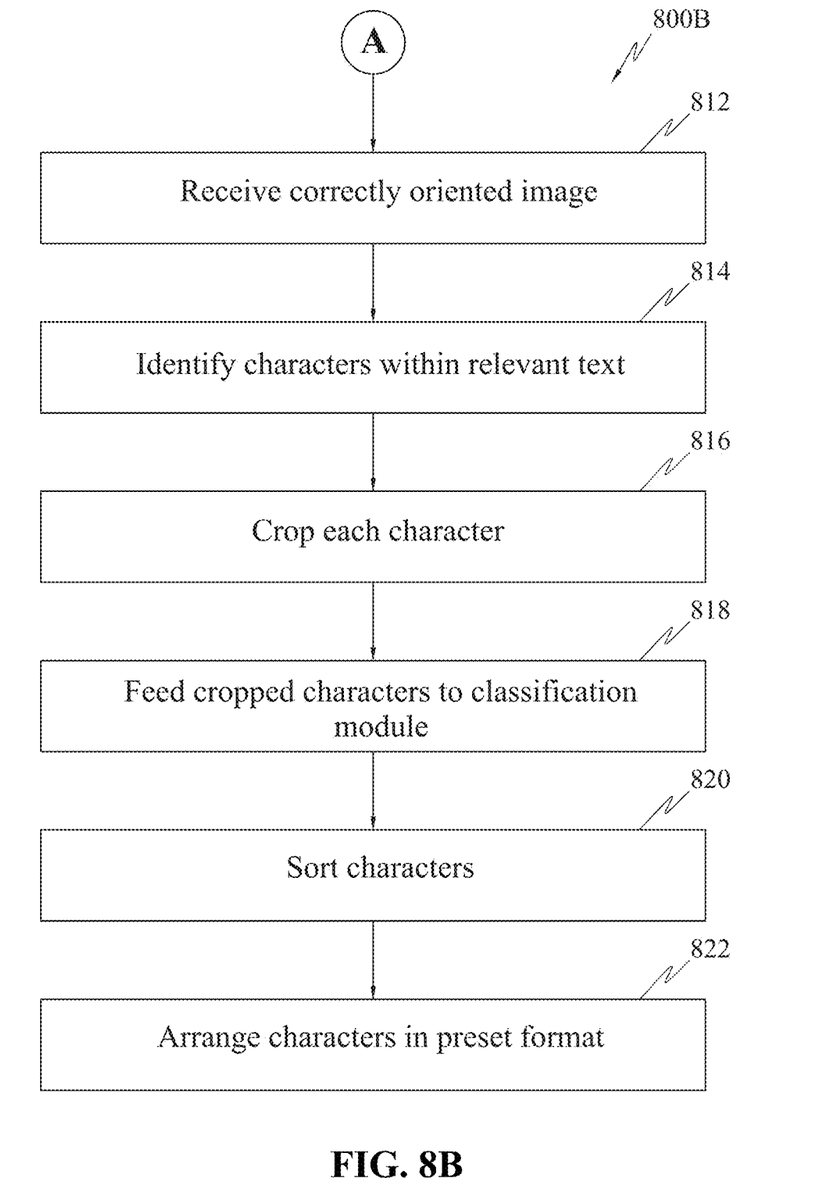
FIG. 8B is a flowchart 800B illustrating the steps involved in extracting the relevant text 204 from the relevant portion 202 in real-time, in accordance with an embodiment.

FIG. 8B is a flowchart 800B illustrating the steps, executed by the system 100, involved in extracting the relevant text 204 from the relevant portion 202.

In an embodiment, at step 812, the correctly oriented image 208 (refer FIG. 2B) may be received from the the orientation detection module 104. The orientation may be corrected with respect to the reference within the stamp 202.

In an embodiment, at step 814, the correctly oriented image 208 (refer FIG. 2B) may be fed to the object detection module 106. The object detection module 106 may be configured to comprise the trained third custom deep neural network and the cropping module. The third custom deep neural network may detect the characters within the text 204 and may bind them using the character bounding boxes 302 (refer FIG. 3), wherein each of the character bounding box 302 may comprise of each character of the relevant text 204. As an example, referring to FIG. 3, the third custom deep neural network may generate character bounding boxes 302 for each of the character ('1', '9', 'M', 'A', 'Y', '2', '0', '1' and '9') of the date 204 marked within the stamp 202. The output of the third custom deep neural network may be the coordinate of each character of the relevant text 204.

In an embodiment, at step 816, each of the bounding box 302 comprising the characters may be cropped out by the cropping module.

In an embodiment, at step 818, each of the cropped character (e.g. 'M', 'Y', '0', 'A', '9', '2', '1', '1' and '9') may be fed to the trained fourth custom deep neural network for classifying each of the character to at least one of the 36 character groups.

In an embodiment, at step 820, each of the character may be sorted by their coordinates, by the sorting module 110. The characters may be sorted to obtain the correct sequence. The correct sequence may be the original sequence of the characters in the date 204. As an example, the original sequence of the characters '1, 9, M, A, Y, 2, 0, 1, 9' may be cropped out by the object detection module 106 in the order 'Y, A, 9, 1, M, 1, 9, 2, 0'. The sorting module 110 may sort the characters to the correct sequence '1, 9, M, A, Y, 2, 0, 1, 9'.

In an embodiment, at step 822, the sorted characters may be aligned in a pre-set format by the formatting module 112. As an example, the pre-set format may be YYYY-MM-DD, wherein 'YYYY' represents the year, 'MM' represents the month and 'DD' represents the date. Consequently, the characters may be arranged as 2019-MAY-19.

Figure 9:
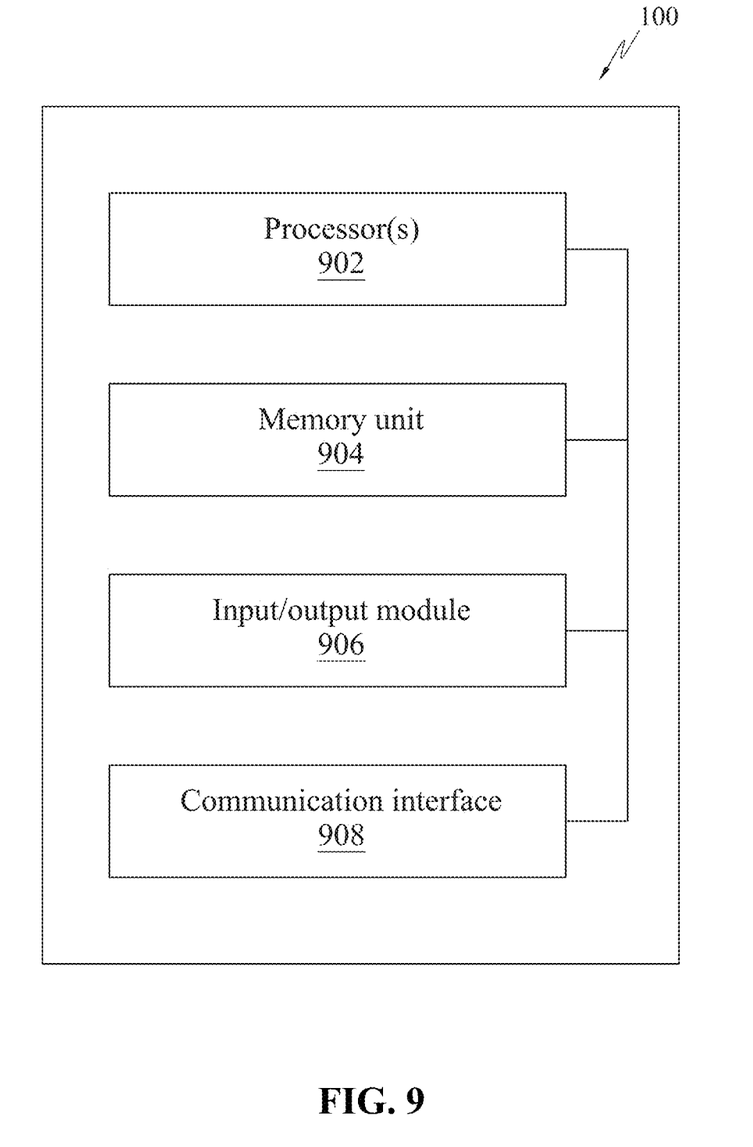
FIG. 9 is a block diagram illustrating hardware elements of the system 100 of FIG. 1A, in accordance with an embodiment.

FIG. 9 is a block diagram illustrating hardware elements of the system 100, in accordance with an embodiment. The system 100 may be implemented using one or more servers, which may be referred to as server 14. The system 100 may include a processor 902, a memory unit 904, an input/output module 906, and a communication interface 908. In an embodiment, the system 100 may be an electronic device and may include smart phones, PDAs, tablet PCs, notebook PCs, laptops, computers or servers among other computing devices.

The processor 902 is implemented in the form of one or more processors and may be implemented as appropriate in hardware, computer executable instructions, firmware, or combinations thereof. Computer-executable instruction or firmware implementations of the processor 902 may include computer-executable or machine-executable instructions written in any suitable programming language to perform the various functions described.

The memory unit 904 may include a permanent memory such as hard disk drive, may be configured to store data, and executable program instructions that are implemented by the processors 902. The memory unit 904 may be implemented in the form of a primary and a secondary memory. The memory unit 904 may store additional data and program instructions that are loadable and executable on the processor 902, as well as data generated during the execution of these programs. Further, the memory unit 904 may be a volatile memory, such as a random access memory and/or a disk drive, or a non-volatile memory. The memory unit 904 may comprise of removable memory such as a Compact Flash card, Memory Stick, Smart Media, Multimedia Card, Secure Digital memory, or any other memory storage that exists currently or may exist in the future.

The input/output module 906 may provide an interface for input devices (e.g., I/O device 10) such as computing devices, scanner, touch screen, mouse, and stylus among other input devices; and output devices (e.g., I/O device 10) such as printer, and additional displays among others. The input/output module 906 may be used to receive data or send data through the communication interface 908.

The communication interface 908 may include a modem, a network interface card (such as Ethernet card), a communication port, and a Personal Computer Memory Card International Association (PCMCIA) slot, among others. The communication interface 908 may include devices supporting both wired and wireless protocols. Data in the form of electronic, electromagnetic, optical, among other signals may be transferred via the communication interface 908.

The processes described above is described as a sequence of steps, this was done solely for the sake of illustration. Accordingly, it is contemplated that some steps may be added, some steps may be omitted, the order of the steps may be re-arranged, or some steps may be performed simultaneously.

The example embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A system for extracting text from images, the system comprising at least one processor configured to:
   receive a digital copy of an image;
   identify a portion of the image using a first custom deep neural network that is trained by the system, wherein the portion comprises text to be extracted;
   determine orientation of the portion of the image with respect to a horizontal axis using a second custom deep neural network that is trained by the system;
   reorient the portion of the image horizontally based on the determined orientation of the portion of the image; and
   extract text from the portion of the image considering the orientation of the portion of the image, wherein the processor is further configured to:
   extract images of relevant characters from the portion of the image comprising the relevant characters that are superimposed over irrelevant characters, with each extracted image of relevant characters comprising individual relevant characters, wherein at least a set of relevant characters is at a different orientation as compared to the irrelevant characters.

2. The system as claimed in claim 1, wherein the portion comprises a second image, which is distinguishable within the image, wherein the second image comprises the text to be extracted.

3. The system as claimed in claim 2, wherein the first custom deep neural network is trained by configuring the system to:
   receive a plurality of training images with pre-identified portion of interest within each of the training images;
   predict portion of interest in each of the training images; and
   refine the first custom deep neural network based on the pre-identified portion of interest and the predicted portion of interest corresponding to each of the training images.

4. The system as claimed in claim 2, wherein the second custom deep neural network is trained by configuring the system to:
   receive a plurality of orientation training images with pre-identified orientation corresponding to each of the orientation training images;
   generate a set of training images using the received plurality of orientation training images;
   predict orientation of each of the orientation training images; and
   refine the second custom deep neural network based on the pre-identified orientation and the predicted orientation corresponding to each of the orientation training images.

5. The system as claimed in claim 1, wherein extracting the text from the portion of the image is enabled by configuring the processor to:
   classify character present in each of the extracted images of the relevant characters into character groups; and
   determine sequence in which each of the characters is presented in the portion based on co-ordinates of the extracted images of the relevant characters within the portion.

6. The system as claimed in claim 5, wherein the irrelevant characters comprises:
   a first set of characters, which are oriented in the same direction as that of the characters in the extracted images of the relevant characters; and
   a second set of characters, which are oriented in one or more directions that are different compared to the direction of orientation of the characters in the extracted images of the relevant characters.

7. The system as claimed in claim 5, wherein extraction of images comprising individual characters is enabled by a third custom deep neural network, wherein the third custom deep neural network is trained by configuring the system to:
   receive a plurality of labelled training images with pre-identified areas within each of the labelled training images, wherein each of the areas binds one character;
   predict areas, each comprising one character, in each of the labelled training images; and
   refine the third custom deep neural network based on the pre-identified areas and the predicted areas corresponding to each of the labelled training images.

8. The system as claimed in claim 5, wherein classifying character present in each of the extracted images into character groups is enabled by a fourth custom deep neural network, wherein the fourth custom deep neural network is trained by configuring the system to:
   receive a plurality of character images corresponding to each of the character groups with pre-identified character for each of the character images;

predict character presented in each of the character images; and refine the fourth custom deep neural network based on the pre-identified character and the predicted character corresponding to each of the character images.

9. A method for extracting text from images, the method comprising:

receiving, by a computing infrastructure, a digital copy of an image;

identifying, by the computing infrastructure using a first custom deep neural network that is trained by the computing infrastructure, a portion of the image, wherein the portion comprises text to be extracted;

determining, by the computing infrastructure using a second custom deep neural network that is trained by the computing infrastructure, orientation of the portion of the image with respect to a horizontal axis;

reorienting, by the computing infrastructure, the portion of the image based on the determined orientation; and extracting, by the computing infrastructure, text from the portion of the image considering the orientation of the portion of the image, wherein extracting text is performed by extracting images of relevant characters from the portion of the image comprising the relevant characters that are superimposed over irrelevant characters, with each extracted image of relevant characters comprising individual relevant characters, wherein at least a set of relevant characters is at a different orientation as compared to the irrelevant characters.

* * * * *